(12) United States Patent
Feng et al.

(10) Patent No.: US 11,909,563 B2
(45) Date of Patent: Feb. 20, 2024

(54) METHOD AND APPARATUS FOR MODULATION RECOGNITION OF SIGNALS BASED ON CYCLIC RESIDUAL NETWORK

(71) Applicant: BEIJING UNIVERSITY OF POSTS AND TELECOMMUNICATIONS, Beijing (CN)

(72) Inventors: Zhiyong Feng, Beijing (CN); Sai Huang, Beijing (CN); Rui Dai, Beijing (CN); Ping Zhang, Beijing (CN); Fan Ning, Beijing (CN); Qixun Zhang, Beijing (CN); Yifan Zhang, Beijing (CN); Zhiqing Wei, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 254 days.

(21) Appl. No.: 17/440,120

(22) PCT Filed: Jul. 30, 2020

(86) PCT No.: PCT/CN2020/105749
§ 371 (c)(1),
(2) Date: Sep. 16, 2021

(87) PCT Pub. No.: WO2021/077841
PCT Pub. Date: Apr. 29, 2021

(65) Prior Publication Data
US 2022/0191066 A1  Jun. 16, 2022

(30) Foreign Application Priority Data

Oct. 24, 2019 (CN) .......................... 201911017496.2

(51) Int. Cl.
*H04L 25/02* (2006.01)
*G06N 3/08* (2023.01)
(Continued)

(52) U.S. Cl.
CPC ......... *H04L 25/0254* (2013.01); *G06N 3/045* (2023.01); *G06N 3/08* (2013.01); *H04L 27/0012* (2013.01)

(58) Field of Classification Search
CPC . H04L 25/0254; H04L 27/0012; G06N 3/045; G06N 3/08; G06N 3/044
See application file for complete search history.

(56) References Cited

U.S. PATENT DOCUMENTS 7,428,270 B1 * 9/2008 Dubuc ................ H04L 27/0012
455/226.1
2006/0188032 A1  8/2006 Kim et al.

FOREIGN PATENT DOCUMENTS

CN  107276938 A  10/2017
CN  108282263 A  7/2018
(Continued)

OTHER PUBLICATIONS

Machine translation of CN-108521387-A. (Year: 2023).*
(Continued)

*Primary Examiner* — Jean B Corrielus
(74) *Attorney, Agent, or Firm* — Cozen O'Connor

(57) ABSTRACT

The embodiments of the present application provide a method and apparatus for modulation recognition of signals based on cyclic residual network, the method comprises: obtaining a signal matrix of a to-be-recognized signal, and extracting real part information and imaginary part information of the signal matrix; generating, according to extracted real part information and imaginary part information, a real-and-imaginary-part feature matrix of the to-be-recognized signal; converting, according to a preset matrix conversion method, the real-and-imaginary-part feature matrix into an amplitude-and-phase feature matrix; and inputting the amplitude-and-phase feature matrix into a pre-trained cyclic residual network to obtain a modulation mode corresponding to the to-be-recognized signal. In the embodiments of the present application, the processing of the to-be-recognized signal is simple and easy to operate, in which neither complex algorithms nor manual processing is required, the flexibility of recognition is high, and the result of modulation recognition of the to-be-recognized signal can be accurately obtained.

9 Claims, 5 Drawing Sheets

(51) Int. Cl.
*H04L 27/00* (2006.01)
*G06N 3/045* (2023.01)

(56) References Cited

FOREIGN PATENT DOCUMENTS

| | | |
|---|---|---|
| CN | 108521387 A | 9/2018 |
| CN | 108616470 A | 10/2018 |
| CN | 109361635 A | 2/2019 |
| CN | 110048980 A | 7/2019 |
| CN | 110071893 A | 7/2019 |
| CN | 110309854 A | 10/2019 |
| CN | 110798417 A | 2/2020 |
| IN | 109274625 A | 1/2019 |

OTHER PUBLICATIONS

Machine translation of CN-105656826-A. (Year: 2023).*
Huang, S. et al., "Automatic Modulation Classification Using Compressive Convolutional Neural Network," IEEE Access, vol. 7, 2019, 8 pages.
Huang, S. et al., "Automatic Modulation Classification Using Contrastive Fully Convolutional Network," IEEE Wireless Communications Letters, vol. 8, Issue 4, 2019, 4 pages.
International Search Report for PCT/CN2020/105749, dated Oct. 10, 2020, 5 pages (including English Translation).

\* cited by examiner

METHOD AND APPARATUS FOR MODULATION RECOGNITION OF SIGNALS BASED ON CYCLIC RESIDUAL NETWORK

The present application claims the priority to a Chinese patent application No. 201911017496.2, filed with the China National Intellectual Property Administration on Oct. 24, 2019 and entitled "method and apparatus for modulation recognition of signals based on cyclic residual network", which is incorporated herein by reference in its entirety.

TECHNICAL FIELD

The application relates to the field of wireless communication technology, in particular to a method and apparatus for modulation recognition of signals based on cyclic residual network.

BACKGROUND

In recent years, Internet of Things that connects networks to things in the real world has developed rapidly and attracted widespread attention. However, the development of the Internet of Things exacerbates the shortage of spectrum resources and leads to difficulty in spectrum allocation. In order to alleviate the shortage of spectrum resources and the difficulty in spectrum allocation, cognitive radio is used for dynamic spectrum detection, which is simply intended to ensure proper use of spectrum in cognitive radio technology, while the modulation mode recognition technology is used to recognize the modulation mode of signals under noise and interference.

The existing process of recognizing the modulation mode of the signal includes: time-frequency analysis on the signal in the sample library, conversion of the time-frequency spectrum of the signal into a gray-scale image, and training of a deep residual network model using the gray-scale image, and detection and recognition of a specific signal in the transmission process using the trained deep residual network model. The specific signal is a signal for targeted training during the model training process.

In the above method of recognizing the modulation mode of the signal, the time-frequency analysis of signals in the sample library and the conversion of the time-spectrogram of signals into a gray-scale image are implemented in the following way. Short-time Fourier transformation is used as a time-frequency analysis method, a centrally symmetric sliding window is used to intercept an observation signal, Fourier transformation is performed on the signal in the sliding window, and the time-spectrogram of signals is converted into a gray-scale image. However, the inventor found that the implementation of this process is complicated and requires manual labor in signal processing. In addition, input signals has variable length in practical applications; while due to its nature, the deep residual network model trained and used in the above method of recognizing the modulation mode of the signal can only process input signals of a fixed length. This makes the recognition method less flexible.

SUMMARY

The embodiments of the present application provide a method and apparatus for modulation recognition of signals based on cyclic residual network to solve the problem of high complexity and low flexibility in processing and recognition of input signals in the prior art. The specific technical solutions are as follows.

In a first aspect, an embodiment of the present application provides a method for modulation recognition of signals based on cyclic residual network, comprising:
  obtaining a signal matrix of a to-be-recognized signal, and extracting real part information and imaginary part information of the signal matrix; wherein, the to-be-recognized signal is a signal whose modulation is to be recognized;
  generating, according to extracted real part information and imaginary part information, a real-and-imaginary-part feature matrix of the to-be-recognized signal;
  converting, according to a preset matrix conversion method, the real-and-imaginary-part feature matrix into an amplitude-and-phase feature matrix; the amplitude-and-phase feature matrix carries amplitude features and phase features of the to-be-recognized signal, and the amount of information of features carried by the amplitude-and-phase feature matrix varies with the amount of information carried by the to-be-recognized signal; and
  inputting the amplitude-and-phase feature matrix into a pre-trained cyclic residual network to obtain a modulation mode corresponding to the to-be-recognized signal; wherein the cyclic residual network is obtained by training according to a preset number of sample feature data items of the to-be-recognized signal and a classification label for the sample feature data items; the sample feature data items comprise a sample amplitude-and-phase feature matrix; and the cyclic residual network comprises: a plurality of gated recurrent units (GRU) configured for processing the amplitude-and-phase feature matrix.

Optionally, before obtaining a signal matrix of a to-be-recognized signal, the method further comprises:
  receiving a plurality of to-be-recognized wireless signals; wherein the plurality of wireless signals are wireless signals received at a plurality of time points in a continuous time period; and
  forming a signal matrix with the plurality of wireless signals.

Optionally, converting, according to a preset matrix conversion method, the real-and-imaginary-part feature matrix into an amplitude-and-phase feature matrix comprises:
  converting the real-and-imaginary-part feature matrix into the amplitude-and-phase feature matrix by means of the following formula:

$$A = \sqrt{I^2 + Q^2}$$
$$P = \arctan\frac{Q}{I}$$

wherein, A represents the amplitude of the to-be-recognized signal, P represents the phase of the to-be-recognized signal, I represents the real part of the to-be-recognized signal, and Q represents the imaginary part of the to-be-recognized signal.

Optionally, a training process of the cyclic residual network comprises:
  constructing an initial cyclic residual network; wherein, the initial cyclic residual network comprises: a feature extracting module, a feature fusion module, and a feature classification module; the feature extracting module comprises: a first convolutional layer, a first residual stack, and a second residual stack; each of the residual stacks comprises: a plurality of residual submodules, each of which comprises: a second convolutional layer, a first batch normalization (BN) layer, and a third convolutional layer; the feature fusion module is configured for performing dimension conversion on feature data output by the feature extracting module; the feature classification module comprises: a plurality of GRUs, a first fully connected (FC) layer and a classifier, each GRU comprising a plurality of hidden layers and a second BN layer;

inputting the sample feature data items and a classification label for the sample feature data items into the initial cyclic residual network;

obtaining, using the initial cyclic residual network, a classification result for the sample feature data items;

calculating a loss function based on a difference between the classification result and the classification label for the sample feature data items;

minimizing the loss function to obtain a minimized loss function;

determining weight parameters for modules in the initial cyclic residual network by using the minimized loss function; and updating, based on the weight parameters, parameters in the initial cyclic residual network to obtain the cyclic residual network by training.

Optionally, the modulation mode comprises one or more of: binary phase shift keying (BPSK), quaternary phase shift keying (QPSK), octal phase shift keying (8PSK), hexadecimal quadrature amplitude modulation (16QAM) and sixty-fourth quadrature amplitude modulation.

Optionally, the formula of the loss function is as follows:

$$J(\theta) = -\frac{1}{M}l(\theta) = -\frac{1}{M}\sum_{m=1}^{M}\sum_{k=1}^{K}y_k^{(m)}\log(h_{\theta_1 H_k}(X^{AP(m)}))$$

wherein, M represents the number of the sample feature data items, K represents the number of modulation modes, θ represents all the parameters in the initial cyclic residual network, $y_k^{(m)}$ represents that the classification label for the mth sample feature data item is the kth modulation mode, $X^{AP(m)}$ represents the mth sample feature data item, $h_{\theta,H_k}(X^{AP(m)})$ represents feature data obtained after the mth sample feature data item is passed through the feature extracting module, l(θ) represents a likelihood function of parameter θ, and $H_k$ represents the kth modulation mode.

In a second aspect, an embodiment of the present application provides an apparatus for modulation recognition of signals based on cyclic residual network, comprising:

an extracting module, configured for obtaining a signal matrix of a to-be-recognized signal, and extracting real part information and imaginary part information of the signal matrix; wherein, the to-be-recognized signal is a signal whose modulation is to be recognized;

a generating module, configured for generating, according to extracted real part information and imaginary part information, a real-and-imaginary-part feature matrix of the to-be-recognized signal;

a converting module, configured for converting, according to a preset matrix conversion method, the real-and-imaginary-part feature matrix into an amplitude-and-phase feature matrix; the amplitude-and-phase feature matrix carries amplitude features and phase features of the to-be-recognized signal, and the amount of information of features carried by the amplitude-and-phase feature matrix varies with the amount of information carried by the to-be-recognized signal; and a recognizing module, configured for inputting the amplitude-and-phase feature matrix into a pre-trained cyclic residual network to obtain a modulation mode corresponding to the to-be-recognized signal; wherein the cyclic residual network is obtained by training according to a preset number of sample feature data items of the to-be-recognized signal and a classification label for the sample feature data items; the sample feature data items comprise a sample amplitude-and-phase feature matrix; and the cyclic residual network comprises: a plurality of gated recurrent units (GRU) configured for processing the amplitude-and-phase feature matrix.

Optionally, the apparatus further comprises:

a receiving module, configured for receiving a plurality of to-be-recognized wireless signals; wherein the plurality of wireless signals are wireless signals received at a plurality of time points in a continuous time period; and a forming module, configured for forming a signal matrix with the plurality of wireless signals.

Optionally, the converting module is specifically configured for:

converting the real-and-imaginary-part feature matrix into the amplitude-and-phase feature matrix by means of the following formula:

$$A = \sqrt{I^2 + Q^2}$$
$$P = \arctan\frac{Q}{I}$$

wherein, A represents the amplitude of the to-be-recognized signal, P represents the phase of the to-be-recognized signal, I represents the real part of the to-be-recognized signal, and Q represents the imaginary part of the to-be-recognized signal.

Optionally, the apparatus further comprises:

a constructing module, configured for constructing an initial cyclic residual network; wherein, the initial cyclic residual network comprises: a feature extracting module, a feature fusion module, and a feature classification module; the feature extracting module comprises: a first convolutional layer, a first residual stack, and a second residual stack; each of the residual stacks comprises: a plurality of residual submodules, each of which comprises: a second convolutional layer, a first batch normalization (BN) layer, and a third convolutional layer; the feature fusion module is configured for performing dimension conversion on feature data output by the feature extracting module; the feature classification module comprises: a plurality of GRUs, a first fully connected (FC) layer and a classifier, each GRU comprising a plurality of hidden layers and a second BN layer;

a first training module, configured for inputting the sample feature data items and a classification label for the sample feature data items into the initial cyclic residual network;

a first obtaining module, configured for obtaining, using the initial cyclic residual network, a classification result for the sample feature data items;

a calculation module, configured for calculating a loss function based on a difference between the classification result and the classification label for the sample feature data items;

a second obtaining module, configured for minimizing the loss function to obtain a minimized loss function;

a determining module, configured for determining weight parameters for modules in the initial cyclic residual network by using the minimized loss function;

a second training module, configured for updating, based on the weight parameters, parameters in the initial cyclic residual network to obtain the cyclic residual network by training.

Optionally, the modulation mode comprises one or more of: binary phase shift keying (BPSK), quaternary phase shift keying (QPSK), octal phase shift keying (8PSK), hexadecimal quadrature amplitude modulation (16QAM) and sixty-fourth quadrature amplitude modulation.

Optionally, the formula of the loss function is as follows:

$$J(\theta) = -\frac{1}{M}l(\theta) = -\frac{1}{M}\sum_{m=1}^{M}\sum_{k=1}^{K} y_k^{(m)} \log(h_{\theta_1 H_k}(X^{AP(m)}))$$

wherein, M represents the number of the sample feature data items, K represents the number of modulation modes, θ represents all the parameters in the initial cyclic residual network, $y_k^{(m)}$ represents that the classification label for the mth sample feature data item is the kth modulation mode, $X^{AP(m)}$ represents the mth sample feature data item, $h_{\theta_1 H_k}(X^{AP(m)})$ represents feature data obtained after the mth sample feature data item is passed through the feature extracting module, l(θ) represents a likelihood function of parameter θ, and $H_k$ represents the kth modulation mode.

In a third aspect, the embodiment of the present application provides an electronic device, including a processor, a communication interface, a memory, and a communication bus, wherein the processor, the communication interface and the memory communicate with each other through the communication bus;

the memory is configured for storing computer programs;

the processor configured for executing the computer programs stored in the memory to implement the method steps of the method for modulation recognition of signals based on cyclic residual network described above in the first aspect.

In a fourth aspect, the present application provides a computer-readable storage medium, having a computer program stored thereon which, when executed by a processor, causes the processor to perform the method steps of the method for modulation recognition of signals based on cyclic residual network described above in the first aspect.

In a fifth aspect, the present application provides a computer program product containing instructions which, when executed on a computer, cause the computer to implement the method steps of the method for modulation recognition of signals based on cyclic residual network described above in the first aspect.

The beneficial effects of the embodiment of the present application are as follows.

The embodiments of the present application provide a method and apparatus for modulation recognition of signals based on cyclic residual network, the method comprises: obtaining a signal matrix of a to-be-recognized signal, and extracting real part information and imaginary part information of the signal matrix; generating a real-and-imaginary-part feature matrix of the to-be-recognized signal; converting, according to a preset matrix conversion method, the real-and-imaginary-part feature matrix into an amplitude-and-phase feature matrix; taking the amplitude-and-phase feature matrix as an input of a pre-trained cyclic residual network to recognize the modulation mode of the to-be-recognized signal. The processing of the signal matrix of the to-be-recognized signal to obtain the amplitude-and-phase feature matrix of the to-be-recognized signal is simple and easy to operate, without requiring complex algorithms or manual operation. In addition, GRU included in the pre-trained cyclic residual network may process the amplitude-and-phase feature matrix, whose amount of information of features varies with the amount of information carried by the to-be-recognized signal, so that the cyclic residual network may recognize the modulation mode of the to-be-recognized signal of any length. Recognition flexibility is thus improved. In addition, the pre-trained cyclic residual network is used to perform feature extraction and feature classification on the to-be-recognized signal, from which the result of modulation recognition of the to-be-recognized signal can be accurately obtained.

Obviously, implementing any product or method of the present application does not necessarily need to achieve all the advantages described above simultaneously.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

The present application is further described in detail below with reference to the appended drawings and embodiments, for the purpose of clarifying the objects, technical solutions and advantages of the present application. Obviously, the described embodiments are only some, and not all, of the embodiments of the present application. All other embodiments obtained based on the embodiments of the present application by those skilled in the art without any creative efforts fall into the scope of protection defined by the present application.

In order to solve the problem of high complexity in analysis of received signals and low flexibility in recognition in existing methods for modulation recognition of signals, embodiments of the present application provide a method, apparatus, electronic device, computer-readable storage medium, and computer program product for modulation recognition of signals based on cyclic residual network.

The method for modulation recognition of signals based on cyclic residual network according to the embodiments of the present application is firstly introduced. The method for modulation recognition of signals based on cyclic residual network according to the embodiment of the present application may be applied to any electronic device that needs to recognize the modulation modes of signals. For example, the electronic device may be a signal receiver, a processor, and the like. For clarity of description, these devices are hereinafter referred to as the electronic device.

Figure 1:
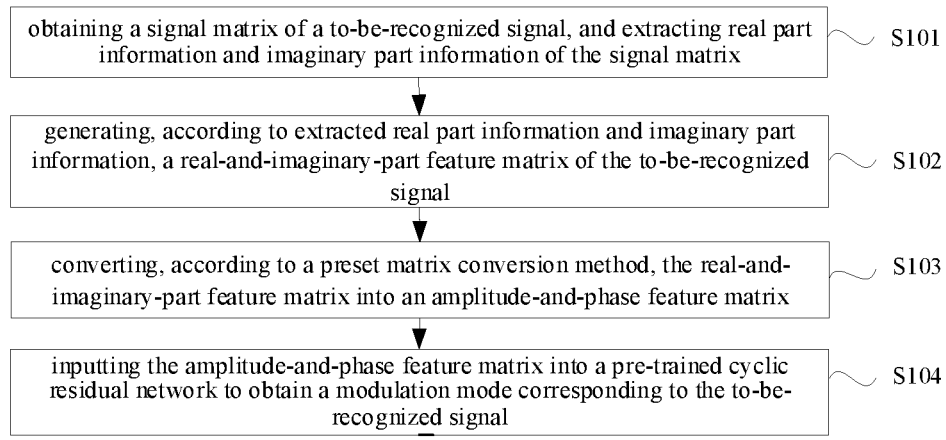
FIG. 1 is a schematic flowchart of a method for modulation recognition of signals based on cyclic residual network provided by an embodiment of the present application.

FIG. 1 is a schematic flowchart of a method for modulation recognition of signals based on cyclic residual network according to an embodiment of the present application. The method includes following operations.

S101, obtaining a signal matrix of a to-be-recognized signal, and extracting real part information and imaginary part information of the signal matrix.

In the embodiment of the present application, the electronic device may receive to-be-recognized signals transmitted by a base station or any signal transmitting apparatus capable of signal transmission, and recognize a modulation mode of the received to-be-recognized signals. The to-be-recognized signals are signals for modulation recognition, i.e., signals whose modulation modes are to be recognized. Exemplarily, the to-be-recognized signals may include, but are not limited to, wireless digital signals, wireless analog signals, and the like.

After receiving to-be-recognized signals, the electronic device can obtain a signal matrix of the to-be-recognized signals. The signal matrix is used to represent the to-be-recognized signal. The to-be-recognized signal may be in the form of a complex signal. Then, the electronic device may extract the real part information and the imaginary part information of the signal matrix. In an implementation, the to-be-recognized signal may include a plurality of signals, and the electronic device may extract the real part information and the imaginary part information corresponding to each of the signals in the signal matrix.

S102, generating, according to extracted real part information and imaginary part information, a real-and-imaginary-part feature matrix of the to-be-recognized signal.

Exemplarily, each of the signals in the obtained signal matrix may be represented in the form of a complex signal as follows:

$$f = a + bi$$

wherein, f represents a signal, a represents the real part of the signal, b represents the imaginary part of the signal, and i represents the imaginary unit.

Exemplarily, the real part a and the imaginary part b of each of the signals in the signal matrix can be extracted. Real parts of signals are placed in one row, and imaginary parts are placed in another row. A real-and-imaginary-part feature matrix of the to-be-recognized signal is thus generated. Since each of the signals has a real part a and an imaginary part b, the number of rows of the real-and-imaginary-part feature matrix for the signals is 2. That is, the number of rows of the generated real-and-imaginary-part feature matrix of the to-be-recognized signals is twice the number of rows of the obtained signal matrix.

S103, converting, according to a preset matrix conversion method, the real-and-imaginary-part feature matrix into an amplitude-and-phase feature matrix.

The amplitude-and-phase feature matrix carries amplitude features and phase features of to-be-recognized signals, and the amount of information of features carried by the amplitude-and-phase feature matrix varies with the amount of information carried by the to-be-recognized signals. The amplitude features describe the maximum deviation of the to-be-recognized signal from the equilibrium position, and the phase feature is a measurement of a to-be-recognized signal's waveform change.

In the embodiment of the present application, the real part information and the imaginary part information of each of the signals in the real-and-imaginary-part feature matrix of the to-be-recognized signal is converted into the amplitude-and-phase feature matrix containing the amplitude feature information and the phase feature information of the signal. The amplitude-and-phase feature matrix has the same size as the real-and-imaginary-part feature matrix. The number of rows is twice the number of modulation modes of the received to-be-recognized signals, and the number of columns is the number of the received to-be-recognized signals with all modulation modes.

As an implementation of an embodiment of the present application, the following formula can be used to convert the real-and-imaginary-part feature matrix into the amplitude-and-phase feature matrix:

$$A = \sqrt{I^2 + Q^2}$$

$$P = \arctan\frac{Q}{I}$$

wherein, A represents an amplitude of the to-be-recognized signal, P represents a phase of the to-be-recognized signal, I represents a real part of the to-be-recognized signal, and Q represents an imaginary part of the to-be-recognized signal.

S104, inputting the amplitude-and-phase feature matrix into a pre-trained cyclic residual network to obtain a modulation mode corresponding to the to-be-recognized signal.

In the embodiment of the present application, the amplitude-and-phase feature matrix of the to-be-recognized signal obtained is inputted into a pre-trained cyclic residual network. The cyclic residual network is obtained by training according to a preset number of the sample feature data of the to-be-recognized signal, a classification label for the sample feature data, the standard sample feature data corresponding to the sample feature data, and a classification label corresponding to the standard sample feature data. The modulation mode corresponding to the to-be-recognized signal is then obtained.

The sample feature data corresponds to the sample amplitude-and-phase feature matrix, and the standard sample feature data corresponds to the standard sample amplitude-and-phase feature matrix. In another implementation, the sample feature data includes the sample amplitude-and-phase feature matrix. The cyclic residual network may include: a plurality of Gated recurrent Units (GRUs). GRU is used to process an amplitude-and-phase feature matrix to further extract the feature information of the amplitude-and-phase feature matrix. Specifically, the training process of the cyclic residual network is described in detail below.

In the embodiment of this application, the modulation mode corresponding to the to-be-recognized signal may include, but is not limited to: binary phase shift keying (BPSK), quaternary phase shift keying (QPSK), octal phase shift keying (8PSK), hexadecimal quadrature amplitude modulation (16QAM) and sixty-fourth quadrature amplitude modulation, etc.

The embodiments of the present application provide a method for modulation recognition of signals based on cyclic residual network, the method comprises: obtaining a signal matrix of a to-be-recognized signal, and extracting real part information and imaginary part information of the signal matrix; generating a real-and-imaginary-part feature matrix of the to-be-recognized signal; converting, according to a preset matrix conversion method, the real-and-imaginary-part feature matrix into an amplitude-and-phase feature matrix; taking the amplitude-and-phase feature matrix as an input of a pre-trained cyclic residual network to recognize the modulation mode of the to-be-recognized signal. The processing of the signal matrix of the to-be-recognized signal to obtain the amplitude-and-phase feature matrix of the to-be-recognized signal is simple and easy to operate, without requiring complex algorithms or manual operation. In addition, GRU included in the pre-trained cyclic residual network may process the amplitude-and-phase feature matrix, whose amount of information of features varies with the amount of information carried by the to-be-recognized signal, so that the cyclic residual network may recognize the modulation mode of the to-be-recognized signal of any length. Recognition flexibility is thus improved. In addition, the pre-trained cyclic residual network is used to perform feature extraction and feature classification on the to-be-recognized signal, from which the result of modulation recognition of the to-be-recognized signal can be accurately obtained.

Figure 2:
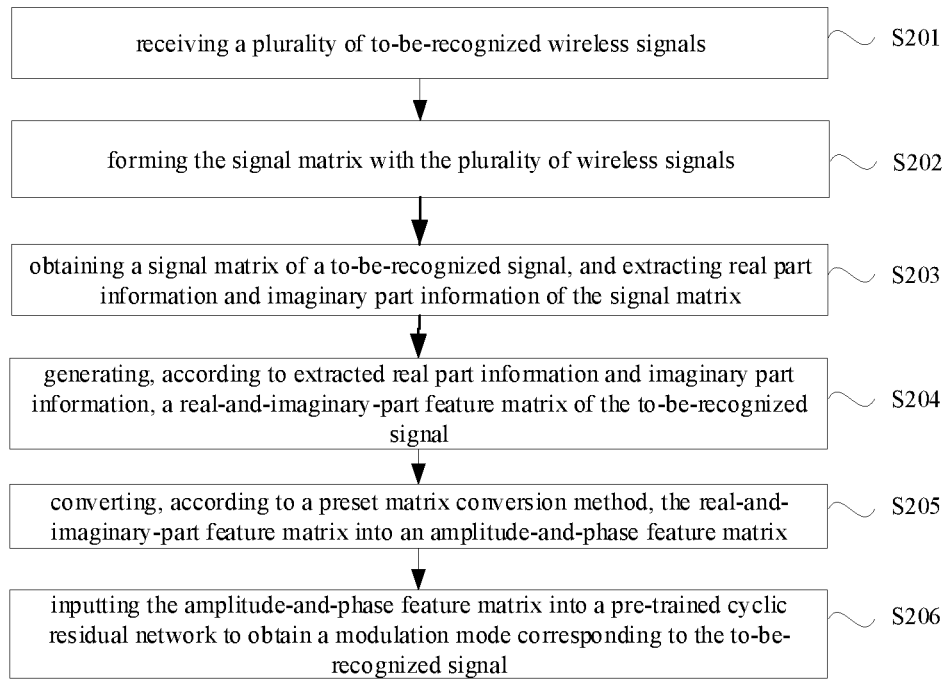
FIG. 2 is a schematic flow chart showing composition of a signal matrix based on the embodiment shown in FIG. 1.

On the basis of the embodiment shown in FIG. 1, as shown in FIG. 2, a method for modulation recognition of signals based on cyclic residual network according to an embodiment of the present application may further include the following steps.

S201, receiving a plurality of to-be-recognized wireless signals.

In the embodiment of this application, a plurality of to-be-recognized wireless signals may be received. The plurality of wireless signals may be wireless signals received at a plurality of time points in a certain time period. Exemplarily, wireless signals with the same modulation mode or with different modulation modes may be received at a plurality of time points within a time period such as 30 seconds or 2 minutes.

As an optional implementation of the embodiment of the present application, any number of wireless signals with the same modulation may be received to recognize the modulation mode of the signals. Specifically, receiving a plurality of to-be-recognized wireless signals may include: receiving a plurality of wireless signals with the same modulation mode received at a plurality of time points in a certain time period.

Correspondingly, the implementation of step S103 may be: extracting the real part information and the imaginary part information of each of the signals in the signal matrix, and then generating, according to the real part information and the imaginary part information of the signals in the signal matrix, a real-and-imaginary-part feature matrix of the to-be-recognized signal. Real part information is placed in one row of the real-and-imaginary-part feature matrix, and imaginary part information is placed in another row. Each column corresponds to one signal. Exemplarily, when receiving N signals with the same modulation mode, the generated real-and-imaginary-part feature matrix of the to-be-recognized signals has 2 rows and N columns.

In one optional implementation of the embodiment of the present application, any number of wireless signals with the different modulation modes may be received to recognize the modulation modes of the signals. Specifically, receiving a plurality of to-be-recognized wireless signals may include: receiving a plurality of wireless signals with modulation modes received at a plurality of time points in a certain time period.

Correspondingly, the implementation of step S103 may be: extracting the real part information and the imaginary part information of each of the signals in the signal matrix, and then generating, according to the real part information and the imaginary part information of the signals in the signal matrix, a real-and-imaginary-part feature matrix of the to-be-recognized signals with different modulation modes, one row of the real-and-imaginary-part feature matrix is the real part information, and another row is the imaginary part information, each column represents one signal.

Exemplarily, when receiving N signals with W different modulation modes, the generated real-and-imaginary-part feature matrix of the to-be-recognized signals with different modulation modes has 2 W rows and N columns. Exemplarily, W may be any value from 1 to 10, and N may be 128, 256, 512, or 1024, and so on.

S202, forming the signal matrix with the plurality of wireless signals.

In the embodiment of the present application, after receiving a plurality of wireless signals with the same modulation mode or with different modulation modes, the received plurality of wireless signals are formed into a signal matrix. Exemplarily, after receiving N wireless signals with the same modulation, the N wireless signals are formed into a 1×N signal matrix, 1 row indicates that the received wireless signals have the same modulation mode, N columns indicate that the number of received wireless signals is N. After receiving N wireless signals with W different modulation modes, the N wireless signals with W different modulation modes are formed into a W×N signal matrix, W rows indicate that the received wireless signals has W modulation modes, and N columns indicate that the number of wireless signals received with each of the modulation modes is N. W modulation modes may be totally different or partly different from one other.

The foregoing steps S201 and S202 may be executed before step S101 in the embodiment shown in FIG. 1, wherein the implementation process of the foregoing steps S203-206 is the same as that of the foregoing steps S101-

S104. Details can be known with reference to the above description, which are not repeated here.

The embodiments of the present application provide a method for modulation recognition of signals based on cyclic residual network, the method comprises: receiving a plurality of to-be-recognized wireless signals; forming the plurality of wireless signals into a signal matrix; obtaining a signal matrix of a to-be-recognized signal; extracting real part information and imaginary part information of the signal matrix; generating a real-and-imaginary-part feature matrix of the to-be-recognized signal; converting, according to a preset matrix conversion method, the real-and-imaginary-part feature matrix into an amplitude-and-phase feature matrix; taking the amplitude-and-phase feature matrix as an input of a pre-trained cyclic residual network to recognize the modulation mode of the to-be-recognized signal. The processing of the signal matrix of the to-be-recognized signal to obtain the amplitude-and-phase feature matrix of the to-be-recognized signal is simple and easy to operate, without requiring complex algorithms or manual operation. In addition, GRU included in the pre-trained cyclic residual network may process the amplitude-and-phase feature matrix, whose amount of information of features varies with the amount of information carried by the to-be-recognized signal, so that the cyclic residual network may recognize the modulation mode of the to-be-recognized signal of any length. Recognition flexibility is thus improved. In addition, the pre-trained cyclic residual network is used to perform feature extraction and feature classification on the to-be-recognized signal, from which the result of modulation recognition of the to-be-recognized signal can be accurately obtained.

Figure 3:
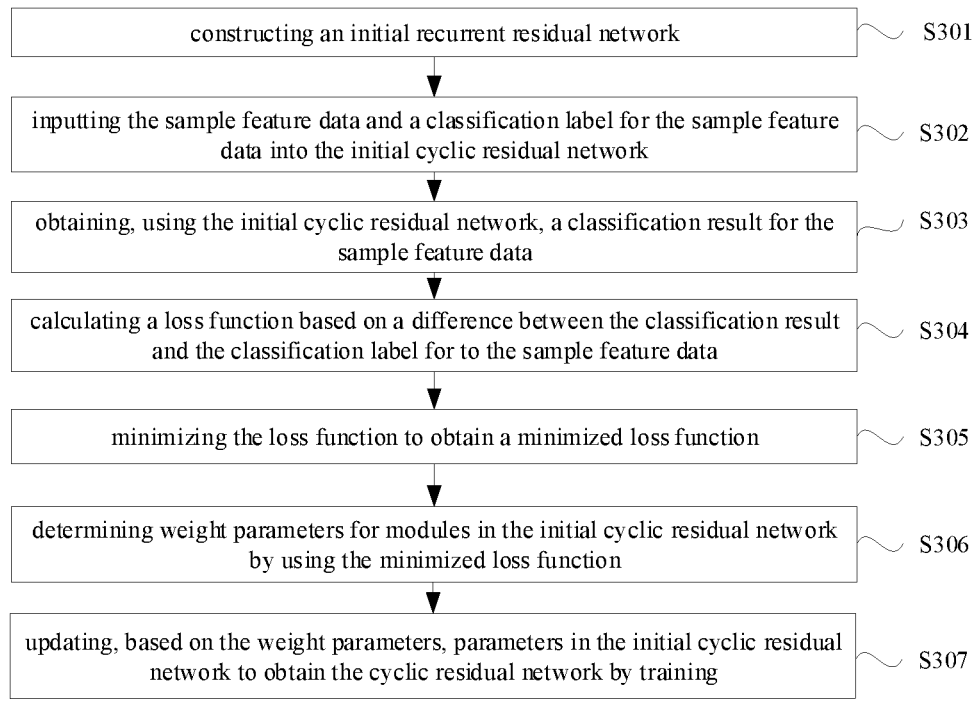
FIG. 3 is a flowchart of a network training process provided by an embodiment of the present application.

As an optional implementation of the embodiment of the present application, as shown in FIG. 3, the training process of the cyclic residual network may include:

S301, constructing an initial cyclic residual network.

Figure 4:
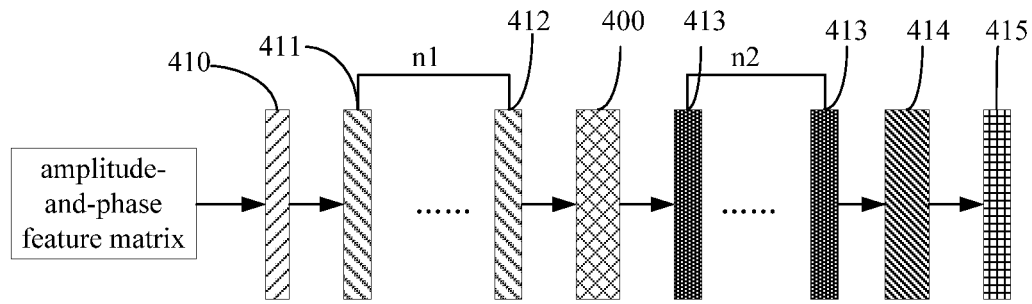
FIG. 4 is a schematic structural diagram of a cyclic residual network provided by an embodiment of the present application.

As an optional implementation of the embodiment of the present application, the constructed initial cyclic residual network model is shown in FIG. 4, and may include: a feature extracting module, a feature fusion module 400, and a feature classification module. The feature extracting module includes: a first convolutional layer 410 and a plurality of residual stacks, the plurality of residual stacks may include a first residual stack 411 and a second residual stack 412, wherein each of the residual stack may include: a plurality of residuals submodules connected in sequence, each of which includes: a second convolutional layer, a first Batch Normalization (BN) layer and a third convolutional layer connected in sequence. The feature fusion module 400 is configured for performing dimension conversion on feature data output by the feature extracting module. The feature classification module includes: a plurality of GRUs 413, a first Fully Connected (FC) layer 414, and a classifier 415. A GRU includes a plurality of hidden layers (not shown in FIG. 4) and the second BN layer (not shown in FIG. 4).

S302, inputting the sample feature data and a classification label for the sample feature data into the initial cyclic residual network.

In the embodiment of the present application, the samples used for training the cyclic residual network may be a preset number of sample feature data items corresponding to the to-be-recognized signals, and the classification label for the sample feature data items. The method for determining the preset number of the sample feature data items corresponding to the to-be-recognized signals may include: modulating a to-be-recognized signal with different modulation modes to obtain a preset number of signals, obtaining a signal matrix corresponding to the to-be-recognized signal with different modulation modes, that is, a signal matrix of the preset number of signals; extracting the real part information and the imaginary part information of each of the signals in the signal matrix; generating the real-and-imaginary-part feature matrix of the preset number of signals; converting the generated real-and-imaginary-part feature matrix into the amplitude-and-phase feature matrix; and taking the amplitude-and-phase feature matrix as the sample feature data.

Exemplarily, a preset number of signals with the same modulation may be used as a sample, that is, in the sample amplitude-and-phase feature matrix corresponding to the sample feature data, each row is taken as a sample and represents a preset number of signals with one modulation. The preset number may be 128, 256, 512, or 1024, etc., which may be empirically set by those skilled in the art. The classification label for the sample feature data may be identifiers of different modulation modes. Specifically, numbers or characters may be used to identify modulation modes, that is, used as identifiers of different modulation modes.

Exemplarily, the training set formed by the sample feature data and the classification label corresponding to the sample feature data may be expressed as:

$$(\Omega_x{^{AP}}, y) = \{(x^{AP(1)}, y^{(1)}), (x^{AP(2)}, y^{(2)}), \quad \ldots \quad, (x^{AP(M)}, y^{(M)})\}$$

$\Omega_x{^{AP}}$ represents the sample feature data set, y represents the classification label set corresponding to the sample feature data, and $(x^{AP(m)}, y^{(m)})$ represents the mth labeled sample data set, $x^{AP(m)}$ represents the mth sample feature data item, the sample feature data item may correspond to the sample amplitude-and-phase feature matrix, M represents the number of sample feature data items, $y^{(m)} = [y_1^{(m)}, y_2^{(m)}, \ldots, y_K^{(m)}]^T$ represents the classification label for the sample feature data item $x^{AP(m)}$, K represents the number of classifications of the modulation modes, when the classification label $y_k^{(m)}$ of the mth sample feature data item $x^{AP(m)}$ is k, the value of $y_k^{(m)}$ is 1, the other items have a value of 0.

S303, obtaining, by using the initial cyclic residual network, a classification result for the sample feature data.

Exemplarily, the preset number of sample feature data items of the to-be-recognized signal and the classification labels corresponding to the sample feature data items are inputted into the initial cyclic residual network as shown in FIG. 4. The convolutional layer is used to extract the feature information of sample feature data items, the BN layer may speed up the training of the entire model by reducing the dependence of the gradient on the parameters, and the FC layer may integrate the features.

For one of the sample feature data items, the size of the sample amplitude-and-phase feature matrix corresponding to the sample feature data is 2×N. Firstly, the sample feature data is input into the first convolutional layer with a convolution kernel size of 1×7, and then input in to a first Rectified Linear Unit (ReLU) layer perform feature extraction on the sample feature data, and 16 feature matrices of 2×N are obtained.

Next, the obtained 16 feature matrices of 2×N are input into the residual stacks. Exemplarily, the number n1 of the residual stacks may be 2. The specific number of the residual stacks may be set by those skilled in the art according to actual needs. The residual stacks may include a plurality of residual submodules. Exemplarily, the number of the residual submodules may be 4. The specific number of the residual submodules may be set by those skilled in the art according to actual needs.

Figure 5:
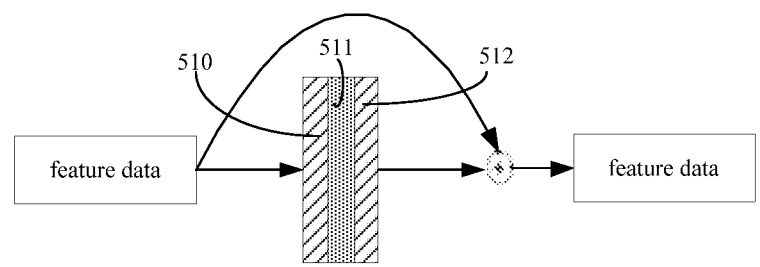
FIG. 5 is a schematic structural diagram of a residual submodule provided by an embodiment of the present application.

The model of the residual submodule may be seen in FIG. 5. For each of the residual submodules in the first residual stack, the 16 feature matrices of 2×N are inputted, in sequence, into a second convolutional layer 510 with a convolution kernel size of 1×5, a first BN layer 511 and a second convolutional layer 512 with a convolution kernel size of 1×5. Then they are further input into a second ReLU layer (not shown in FIG. 5) and a first BN layer (not shown in FIG. 5) in sequence to extract more detailed features of the feature matrix. After the residual stacks, the number of feature matrices is 32, i.e., 32 feature matrices of 2×N.

Figure 6:
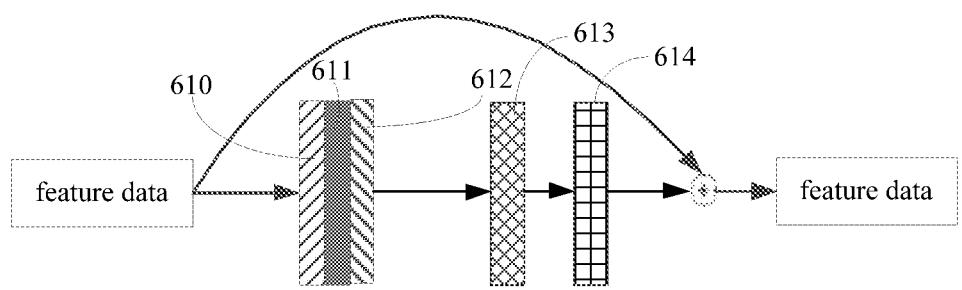
FIG. 6 is another schematic structural diagram of a residual submodule provided by an embodiment of the present application.

Specifically, the model of the residual submodule may be shown in FIG. 6. For each of the residual submodules in the first residual stack, the 16 feature matrices of 2×N are inputted, in sequence, into a second convolutional layer 610 with a convolution kernel size of 1×5, a first BN layer 611 and a second convolutional layer 612 with a convolution kernel size of 1×5; and then the matrices are inputted into a second ReLU layer 613 and a first BN layer 614 in sequence to further extract more detailed features of the feature matrix. After the residual stacks, 32 feature matrices of 2×N are obtained.

For each of the residual submodules in the second residual stack, the 32 feature matrices of 2×N are inputted into a second convolutional layer with a convolution kernel size of 1×5, a first BN layer and a second convolutional layer with a convolution kernel size of 1×5 in; and then are further inputted into a second ReLU layer and a first BN layer to extract more detailed features of the feature matrix. After the residual stacks, 64 three-dimensional feature matrices of 2×N are obtained.

Again, 64 3D feature matrices of 2×N are inputted into the feature fusion module, and dimension conversion is performed on the feature data in the feature matrix to obtain 64 2D feature matrices of 2×N. Exemplarily, the 3D feature matrix, expressed in the form of (x, y, z), may have feature data in y and z dimensions merged into one-dimensional feature data. In this way, the feature matrix becomes a 2D matrix, then the feature data of the x dimension and the merged dimension are exchanged to obtain 64 2D feature matrices of 2×N.

Finally, 64 2D feature matrices of 2×N are inputted into GRUs. For example, the number n2 of the GRUs may be 2. The specific number of GRUs may be set by those skilled in the art according to actual needs. Each of the GRUs may contain 64 hidden layers and a second BN layer. Specifically, 64 2D feature matrices of 2×N are inputted into 64 hidden layers, the second BN layer, and a third ReLU layer in sequence. The 64 hidden layers, the second BN layer, and the third ReLU layer perform feature extraction on the 2D feature matrix to obtain a K×1 feature matrix. K is the number of classifications of modulation modes during training.

Then the K×1 feature matrix is inputted into a first FC layer to further integrate the features. The feature matrix is further inputted into the classifier to obtain the classification result for the sample feature data. Exemplarily, the classification result for the sample feature data may be the classification label for the sample feature data, and the classification label may identify the classification of the modulation of the signal corresponding to the sample feature data. Each of the classifications corresponds to a modulation mode. The classification label for the classification may be 1, 2, 3 . . . K, etc. The specific form is not limited in the embodiment of this application. Exemplarily, the classifier may include, but is not limited to, a softmax classifier.

Exemplarily, the classification result for the sample feature data output by the initial cyclic residual network may be expressed as:

$$h_\Theta(X^{AP(m)}) = [h_{\Theta|H_k}(X^{AP(m)})], (k=1,2,\ldots,K)$$

wherein, $h_\Theta(\cdot)$ represents the cyclic residual network, $x^{AP(m)}$ represents the mth sample feature data item, $h_{\Theta|H_k}(x^{AP(m)})$ represents the feature extraction value of the kth modulation modes (i.e., the classification result corresponding to the mth sample feature data item), θ represents all of the parameters in the initial cyclic residual network.

Referring to FIG. 3, S304, calculating a loss function based on a difference between the classification result and the classification label for to the sample feature data.

In the embodiment of the present application, the formula of the loss function adopted may be as follows:

$$J(\theta) = -\frac{1}{M} l(\theta) = -\frac{1}{M} \sum_{m=1}^{M} \sum_{k=1}^{K} y_k^{(m)} \log(h_{\theta_1 H_k}(X^{AP(m)}))$$

wherein, M represents the number of the sample feature data items, K represents the number of modulation modes, θ represents all the parameters in the initial cyclic residual network, $y_k^{(m)}$ represents that the classification label for the mth sample feature data item is the kth modulation mode, $x^{AP(m)}$ represents the mth sample feature data item, $h_{\theta|H_k}(X^{AP(m)})$ represents feature data obtained after the mth sample feature data item is passed through the feature extracting module, l(θ) represents a likelihood function of parameter θ, and $H_k$ represents the kth modulation mode.

S305, minimizing the loss function to obtain a minimized loss function.

As an optional implementation of the embodiment of this application, a likelihood function method may be used to minimize the loss function. Exemplarily, the likelihood function l(θ) may be expressed as:

$$L(\theta) = P(y \mid \Omega_{X^{AP}}; \theta)$$

$$= \prod_{m=1}^{M} P(y_k^{(m)} \mid X^{AP(m)}; \theta)$$

$$= \prod_{m=1}^{M} \prod_{k=1}^{K} (h_{\theta|H_k}(X^{AP(m)}))^{y(m)(k)}$$

wherein, $P(y|\Omega_{x^{AP}};\theta)$ represents the joint distribution rate of the sample feature data set $\Omega_{x^{AP}}$ corresponding to the classification label set y, $x^{AP(m)}$ represents the mth the sample feature data, $y_k^{(m)}$ represents the classification label of the mth the sample feature data $x^{AP(m)}$, $h_{\Theta|H_k}(x^{AP(m)})$: represents the feature extraction value of the kth modulation mode, $y(m)^{(k)}$ represents the classification label of the mth the sample feature data is k.

S306, determining weight parameters for modules in the initial cyclic residual network by using the minimized loss function.

S307, updating, based on the weight parameters, parameters in the initial cyclic residual network to obtain the cyclic residual network by training.

In the above steps S306 to S307, the weight parameters for modules in the initial cyclic residual network are determined according to the minimized loss function. Finally, the weight parameters are used to update the parameters in the initial cyclic residual network to obtain the cyclic residual network through training. This process may be implemented in ways known in the art. For example, a gradient descent algorithm or a stochastic gradient descent algorithm may be to train and obtain a cyclic residual network, the detail of which is omitted in the embodiments of the present application.

Exemplarily, in the embodiment of the present application, the trained cyclic residual network is tested. For example, F sample signals of a single antenna system are received. The F sample signals are processed to obtain an amplitude-and-phase feature matrix, the obtained amplitude-and-phase feature matrix is inputted into the trained cyclic residual network for classification and recognition. Test statistics is defined as modulation classification, which is expressed as:

$$T_{H_k} = e_{H_k} \cdot h_\theta^*(x^{AP})$$

wherein, $T_{H_k}$ represents a predicted result vector, which is composed of K elements that respectively represent K modulation modes. The value of each of these K elements represents the probability that the modulation mode of the sample signal is the corresponding modulation mode. If the probability is high, it is indicated that the modulation mode of the sample signal is this corresponding modulation mode, $H_k$: represents the kth modulation mode, the vector $e_{H_k}$: represents the test statistics of the kth modulation mode, and $h_\theta^*(x^{AP})$ is the output of the cyclic residual network.

The following formula may be used to express the result of the recognized modulation mode:

$$k = \arg\max_{1 \le k \le K} T_{H_k}$$

Figure 7:
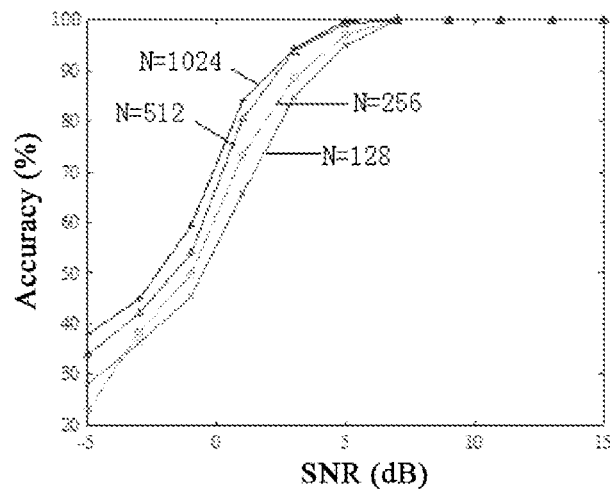
FIG. 7 is a schematic diagram of simulation results of recognition with different signal lengths according to an embodiment of the present application.

Exemplarily, as shown in FIG. 7, FIG. 7 is a schematic diagram of the simulation result for recognition with different signal lengths provided by the embodiment of the present application. FIG. 7 shows classification recognition accuracies of signals with different signal lengths using the method according to the embodiment of the present application, wherein N is the signal length, that is, the number of signals included in the to-be-recognized signals, which is 128, 256, 512, and 1024, respectively. As can be seen, the accuracy is improved as signal length increases. This result indicates that the method of the embodiments of the present application has the advantages of progressiveness. In particular, when the signal-to-noise ratio (SNR) reaches 4 dB and the signal length is fixed at 128, the accuracy of classification recognition reaches 90%.

Figure 8:
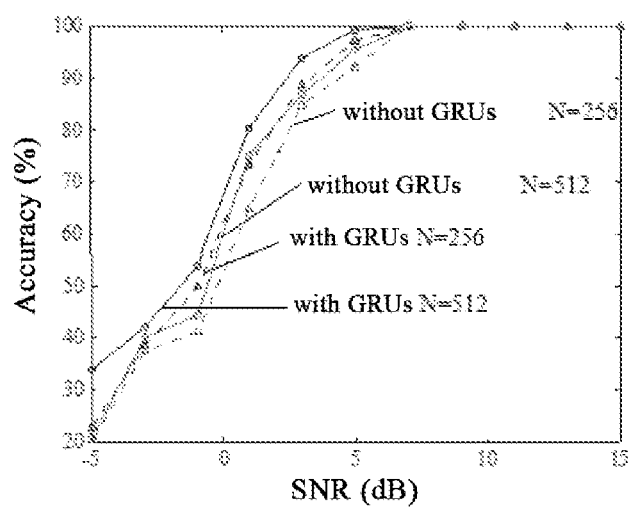
FIG. 8 is a schematic diagram of simulation results using different network models provided by an embodiment of the present application.

Exemplarily, as shown in FIG. 8, FIG. 8 is a schematic diagram of simulation results using different network models provided by an embodiment of the present application. The exemplary results are shown for cyclic residual network models with or without GRU, and received signals having lengths of 256 and 512 respectively. As shown in FIG. 8, the cyclic residual network with the GRU layer has improved performance and accuracy rate compared with a network without the GRU layer. The performance of the GRU-containing cyclic residual network for a 256-length signal is better than that of the GRU-free cyclic residual network for a 512-length signal. In particular, when the number of samples is fixed to 512, the signal-to-noise ratio of the GRU-containing cyclic residual network is 2 dB lower than the GRU-free cyclic residual network for a classification and recognition accuracy of 95%. 256 sample points and 512 sample points indicate that the signal length is 256 and 512 respectively.

Figure 9:
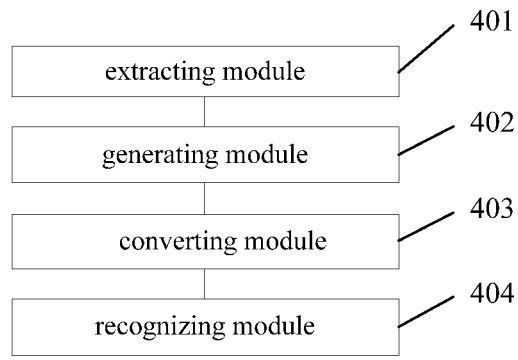
FIG. 9 is a schematic structural diagram of an apparatus for modulation recognition of signals based on cyclic residual network provided by an embodiment of the present application.

Corresponding to the above method embodiment, the embodiment of the present application provides an apparatus for modulation recognition of signals based on cyclic residual network, as shown in FIG. 9, the apparatus comprises:

an extracting module 401, configured for obtaining a signal matrix of a to-be-recognized signal, and extracting real part information and imaginary part information of the signal matrix; wherein, the to-be-recognized signal is a signal whose modulation is to be recognized;

a generating module 402, configured for generating, according to extracted real part information and imaginary part information, a real-and-imaginary-part feature matrix of the to-be-recognized signal;

a converting module 403, configured for converting, according to a preset matrix conversion method, the real-and-imaginary-part feature matrix into an amplitude-and-phase feature matrix; the amplitude-and-phase feature matrix carries amplitude features and phase features of the to-be-recognized signal, and the amount of information of features carried by the amplitude-and-phase feature matrix varies with the amount of information carried by the to-be-recognized signal; and a recognizing module 404, configured for inputting the amplitude-and-phase feature matrix into a pre-trained cyclic residual network to obtain a modulation mode corresponding to the to-be-recognized signal; wherein the cyclic residual network is obtained by training according to a preset number of sample feature data items of the to-be-recognized signal and a classification label for the sample feature data items; the sample feature data items comprise a sample amplitude-and-phase feature matrix; and the cyclic residual network comprises: a plurality of gated recurrent units (GRU) configured for processing the amplitude-and-phase feature matrix.

The embodiments of the present application provide an apparatus for modulation recognition of signals based on cyclic residual network, the method comprises: obtaining a signal matrix of a to-be-recognized signal, and extracting real part information and imaginary part information of the signal matrix; generating a real-and-imaginary-part feature matrix of the to-be-recognized signal; converting, according to a preset matrix conversion method, the real-and-imaginary-part feature matrix into an amplitude-and-phase feature matrix; taking the amplitude-and-phase feature matrix as an input of a pre-trained cyclic residual network to recognize the modulation mode of the to-be-recognized signal. The processing of the signal matrix of the to-be-recognized signal to obtain the amplitude-and-phase feature matrix of the to-be-recognized signal is simple and easy to operate, without requiring complex algorithms or manual operation. In addition, GRU included in the pre-trained cyclic residual network may process the amplitude-and-phase feature matrix, whose amount of information of features varies with the amount of information carried by the to-be-recognized signal, so that the cyclic residual network may recognize the modulation mode of the to-be-recognized signal of any length. Recognition flexibility is thus improved. In addition, the pre-trained cyclic residual network is used to perform feature extraction and feature classification on the to-berecognized signal, from which the result of modulation recognition of the to-be-recognized signal can be accurately obtained.

It should be noted that the apparatus in the embodiment of the present application is an apparatus corresponding to the method for modulation recognition of signals based on cyclic residual network shown in FIG. 1, and all the embodiments of the method for modulation recognition of signals based on cyclic residual network shown in FIG. 1 are applicable to the apparatus, and achieve the same beneficial effects.

Figure 10:
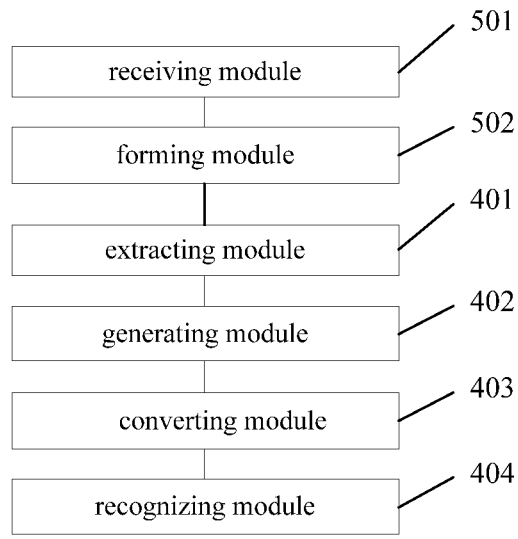
FIG. 10 is a schematic structural diagram of another apparatus for modulation recognition of signals based on cyclic residual network provided by an embodiment of the present application.

Optionally, based on FIG. 9, as shown in FIG. 10, the foregoing apparatus may further include:

a receiving module 501, configured for receiving a plurality of to-be-recognized wireless signals; wherein the plurality of wireless signals are wireless signals received at a plurality of time points in a continuous time period; and a forming module 502, configured for forming a signal matrix with the plurality of wireless signals.

Optionally, the converting module 403 is specifically configured for:

converting the real-and-imaginary-part feature matrix into the amplitude-and-phase feature matrix by means of the following formula:

$$A = \sqrt{I^2 + Q^2}$$
$$P = \arctan\frac{Q}{I}$$

wherein, A represents the amplitude of the to-be-recognized signal, P represents the phase of the to-be-recognized signal, I represents the real part of the to-be-recognized signal, and Q represents the imaginary part of the to-be-recognized signal.

Optionally, the above mentioned apparatus further comprises:

a constructing module, configured for constructing an initial cyclic residual network; wherein, the initial cyclic residual network comprises: a feature extracting module, a feature fusion module, and a feature classification module; the feature extracting module comprises: a first convolutional layer, a first residual stack, and a second residual stack; each of the residual stacks comprises: a plurality of residual submodules, each of which comprises: a second convolutional layer, a first batch normalization (BN) layer, and a third convolutional layer; the feature fusion module is configured for performing dimension conversion on feature data output by the feature extracting module; the feature classification module comprises: a plurality of GRUs, a first fully connected (FC) layer and a classifier, each GRU comprising a plurality of hidden layers and a second BN layer;

a first training module, configured for inputting the sample feature data items and a classification label for the sample feature data items into the initial cyclic residual network;

a first obtaining module, configured for obtaining, using the initial cyclic residual network, a classification result for the sample feature data items;

a calculation module, configured for calculating a loss function based on a difference between the classification result and the classification label for the sample feature data items;

a second obtaining module, configured for minimizing the loss function to obtain a minimized loss function;

a determining module, configured for determining weight parameters for modules in the initial cyclic residual network by using the minimized loss function; and a second training module, configured for updating, based on the weight parameters, parameters in the initial cyclic residual network to obtain the cyclic residual network by training.

Optionally, the modulation mode comprises one or more of: binary phase shift keying (BPSK), quaternary phase shift keying (QPSK), octal phase shift keying (8PSK), hexadecimal quadrature amplitude modulation (16QAM) and sixty-fourth quadrature amplitude modulation.

Optionally, the formula of the loss function is as follows:

$$J(\theta) = -\frac{1}{M}l(\theta) = -\frac{1}{M}\sum_{m=1}^{M}\sum_{k=1}^{K}y_k^{(m)}\log(h_{\theta_1 H_k}(X^{AP(m)}))$$

wherein, M represents the number of the sample feature data items, K represents the number of modulation modes, θ represents all the parameters in the initial cyclic residual network, $y_k^{(m)}$ represents that the classification label for the mth sample feature data item is the kth modulation mode, $X^{AP(m)}$ represents the mth sample feature data item, $h_{\theta_1 H_k}(X^{AP(m)})$ represents feature data obtained after the mth sample feature data item is passed through the feature extracting module, l(θ) represents a likelihood function of parameter θ, and $H_k$ represents the kth modulation mode.

Figure 11:
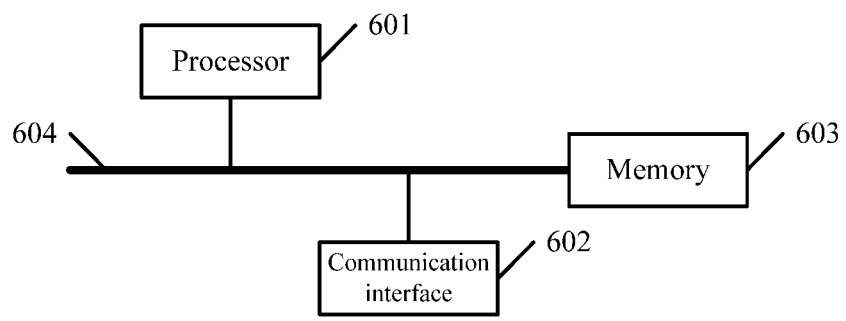
FIG. 11 is a schematic structural diagram of an electronic device provided by an embodiment of the present application.

The embodiments of the present application further provides an electronic device, as shown in FIG. 11, including a processor 601, a communication interface 602, a memory 603, and a communication bus 604, wherein the processor 601, the communication interface 602 and the memory 603 communicate with each other through the communication bus 604;

the memory 603 configured for storing computer programs;

the processor 601 is configured for implementing the steps of the method for modulation recognition of signals based on cyclic residual network provided by the embodiment of the present application when executing the computer program stored in the memory 603.

The embodiments of the present application provide an electronic device capable of: obtaining a signal matrix of a to-be-recognized signal, and extracting real part information and imaginary part information of the signal matrix; generating a real-and-imaginary-part feature matrix of the to-be-recognized signal; converting, according to a preset matrix conversion method, the real-and-imaginary-part feature matrix into an amplitude-and-phase feature matrix; taking the amplitude-and-phase feature matrix as an input of a pre-trained cyclic residual network to recognize the modulation mode of the to-be-recognized signal. The processing of the signal matrix of the to-be-recognized signal to obtain the amplitude-and-phase feature matrix of the to-be-recognized signal is simple and easy to operate, without requiring complex algorithms or manual operation. In addition, GRU included in the pre-trained cyclic residual network may process the amplitude-and-phase feature matrix, whose amount of information of features varies with the amount of information carried by the to-be-recognized signal, so that the cyclic residual network may recognize the modulation mode of the to-be-recognized signal of any length. Recognition flexibility is thus improved. In addition, the pre-trained cyclic residual network is used to perform feature extraction and feature classification on the to-be-recognized signal, from which the result of modulation recognition of the to-be-recognized signal can be accurately obtained.

The communication bus in the above electronic device may be a Peripheral Component Interconnect (PCI) bus or an Extended Industry Standard Architecture (EISA) bus. The communication bus can include an address bus, a data bus, a control bus, and the like. For convenience, the communication bus is only shown as one thick line in the figure, but it does not mean that there is only one bus or one type of bus.

The communication interface is used for communication between the above electronic device and other devices.

The memory may include a random access memory (RAM), and may also include a non-volatile memory (NVM), such as at least one disk storage device. Optionally, the memory may also be at least one storage device located away from the aforementioned processor.

The above processor may be a general-purpose processor, including a central processing unit (CPU), a network processor (NP), etc.; or may be a digital signal processing (DSP), an application specific integrated circuit (ASIC), field-programmable gate array (FPGA) or other programmable logic device, discrete gate or transistor logic device, discrete hardware component.

In another embodiment of the present application, there further provides a computer-readable storage medium, having a computer program stored thereon which, when executed by a processor, causes the processor to implement the steps of any above mentioned method for modulation recognition of signals based on cyclic residual network, so as to achieve the same technical effect.

In another embodiment provided by the present application, there further provides a computer program product containing instructions which, when executed on a computer, cause the computer to implement the steps of any above mentioned methods for modulation recognition of signals based on cyclic residual network, so as to achieve the same technical effect.

Above embodiments may be fully or partially embodied in software, hardware, firmware, or any combination thereof. When implemented by software, all or part of the embodiments may be implemented in the form of a computer program product. The computer program product includes one or more computer instructions. When the computer program instructions are loaded and executed on a computer, the procedures or functions described in accordance with the embodiments of the present application will take place in whole or in part. The computer may be a general purpose computer, a special purpose computer, a network of computers, or other programmable device. The computer instructions may be stored in a computer-readable storage medium or transmitted from one computer-readable storage medium to another computer-readable storage medium, for example, the computer instructions may be transmitted from one website, computer, server, or data center to another website, computer, server, or data center via wired (e.g., coaxial cable, fiber optic, Digital Subscriber Line (DSL)) or wireless (e.g., infrared, wireless, microwave, etc.) means. The computer-readable storage medium may be any usable medium that can be accessed by a computer or a data storage device, such as an integrated server, an integrated data center, etc., that includes one or more usable media. The usable media may be a magnetic media (e.g., floppy Disk, hard Disk, magnetic tape), an optical media (e.g., DVD), or a semiconductor media (e.g., Solid State Disk (SSD)), among others.

It should be noted that in this article, the relationship terms such as "first", "second", and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which comprise these elements.

Each embodiment in this specification is described in a related manner, and the same or similar parts between the various embodiments can be referred to each other, and each embodiment focuses on the difference from other embodiments. Especially, since the embodiments of the apparatus, the electronic device, the computer-readable storage medium and the computer program product are basically similar to the foregoing method embodiment, the description is relatively simple, and for related parts, reference can be made to the part of the description of the method embodiment.

The above description is only the preferred embodiments of the present application and is not intended to limit the protection scope of the present application. Any amendments, equivalent substitutions, improvements etc. made within the spirit and principle of the present application are all included in the protection scope of the present application.

What is claimed is:

1. A method for modulation recognition of signals based on a cyclic residual network, comprising:
    obtaining a signal matrix of a to-be-recognized signal, and extracting real part information and imaginary part information of the signal matrix; wherein, the to-be-recognized signal is a signal whose modulation is to be recognized;
    generating, according to the extracted real part information and the extracted imaginary part information, a real-and-imaginary-part feature matrix of the to-be-recognized signal;
    converting, according to a preset matrix conversion method, the real-and-imaginary-part feature matrix into an amplitude-and-phase feature matrix; the amplitude-and-phase feature matrix carries amplitude features and phase features of the to-be-recognized signal, and an amount of information of features carried by the amplitude-and-phase feature matrix varies with an amount of information carried by the to-be-recognized signal; and
    inputting the amplitude-and-phase feature matrix into a pre-trained cyclic residual network to obtain a modulation mode corresponding to the to-be-recognized signal; wherein the cyclic residual network is obtained by training according to a preset number of sample feature data items of the to-be-recognized signal and a classification label for the sample feature data items; the sample feature data items comprise a sample amplitude-and-phase feature matrix; and the cyclic residual network comprises: a plurality of gated recurrent units (GRU) configured for processing the amplitude-and-phase feature matrix.

2. The method according to claim 1, wherein before obtaining the signal matrix of the to-be-recognized signal, the method further comprises:
receiving a plurality of to-be-recognized wireless signals; wherein the plurality of wireless signals are wireless signals received at a plurality of time points in a continuous time period; and
forming the signal matrix with the plurality of wireless signals.

3. The method according to claim 1, wherein converting, according to the preset matrix conversion method, the real-and-imaginary-part feature matrix into the amplitude-and-phase feature matrix comprises:
converting the real-and-imaginary-part feature matrix into the amplitude-and-phase feature matrix by means of the following formula:

$$A = \sqrt{I^2 + Q^2}$$
$$P = \arctan\frac{Q}{I}$$

wherein, A represents the amplitude of the to-be-recognized signal, P represents the phase of the to-be-recognized signal, I represents the real part of the to-be-recognized signal, and Q represents the imaginary part of the to-be-recognized signal.

4. The method according to claim 1, wherein the training process of the cyclic residual network comprises:
constructing an initial cyclic residual network; wherein, the initial cyclic residual network comprises: a feature extracting module, a feature fusion module, and a feature classification module; the feature extracting module comprises: a first convolutional layer, a first residual stack, and a second residual stack; each of the first and the second residual stacks comprises: a plurality of residual submodules, each of which comprises: a second convolutional layer, a first batch normalization (BN) layer, and a third convolutional layer; the feature fusion module is configured for performing dimension conversion on feature data output by the feature extracting module; the feature classification module comprises: a plurality of GRUs, a first fully connected (FC) layer and a classifier, each GRU of the feature classification module comprising a plurality of hidden layers and a second BN layer;
inputting the sample feature data items and a classification label for the sample feature data items into the initial cyclic residual network;
obtaining, using the initial cyclic residual network, a classification result for the sample feature data items;
calculating a loss function based on a difference between the classification result and the classification label for the sample feature data items;
minimizing the loss function to obtain a minimized loss function;
determining weight parameters for modules in the initial cyclic residual network by using the minimized loss function; and
updating, based on the weight parameters, parameters in the initial cyclic residual network to obtain the cyclic residual network by training.

5. The method according to claim 1, wherein the modulation mode comprises one or more of: binary phase shift keying (BPSK), quaternary phase shift keying (QPSK), octal phase shift keying (8PSK), hexadecimal quadrature amplitude modulation (16QAM) and sixty-fourth quadrature amplitude modulation.

6. The method according to claim 4, wherein the formula of the loss function is as follows:

$$J(\theta) = -\frac{1}{M}l(\theta) = -\frac{1}{M}\sum_{m=1}^{M}\sum_{k=1}^{K}y_k^{(m)}\log(h_{\theta_1 H_k}(X^{AP(m)}))$$

wherein, M represents the number of the sample feature data items, K represents the number of modulation modes, $\theta$ represents all the parameters in the initial cyclic residual network, $y_k^{(m)}$ represents that the classification label for the mth sample feature data item is the kth modulation mode, $X^{AP(m)}$ represents the mth sample feature data item, $h_{\theta_1 H_k}(X^{AP(m)})$ represents feature data obtained after the mth sample feature data item is passed through the feature extracting module, $l(\theta)$ represents a likelihood function of parameter $\theta$, and $H_k$ represents the kth modulation mode.

7. A non-transitory computer-readable storage medium, having a computer program stored thereon which, when executed by a processor, causes the processor to perform method steps of claim 1.

8. An electronic device, comprising a processor, a communication interface, a memory, and a communication bus, through which the processor, the communication interface and the memory communicate with each other;
the memory is configured for storing computer programs;
the processor is configured for performing a method for modulation recognition of signals based on a cyclic residual network when executing the computer programs stored in the memory, the method comprising:
obtaining a signal matrix of a to-be-recognized signal, and extracting real part information and imaginary part information of the signal matrix; wherein, the to-be-recognized signal is a signal whose modulation is to be recognized;
generating, according to the extracted real part information and the extracted imaginary part information, a real-and-imaginary-part feature matrix of the to-be-recognized signal;
converting, according to a preset matrix conversion method, the real-and-imaginary-part feature matrix into an amplitude-and-phase feature matrix; the amplitude-and-phase feature matrix carries amplitude features and phase features of the to-be-recognized signal, and an amount of information of features carried by the amplitude-and-phase feature matrix varies with an amount of information carried by the to-be-recognized signal; and
inputting the amplitude-and-phase feature matrix into a pre-trained cyclic residual network to obtain a modulation mode corresponding to the to-be-recognized signal; wherein the cyclic residual network is obtained by training according to a preset number of sample feature data items of the to-be-recognized signal and a classification label for the sample feature data items; the sample feature data items comprise a sample amplitude-and-phase feature matrix; and the cyclic residual network comprises: a plurality of gated recurrent units (GRU) configured for processing the amplitude-and-phase feature matrix.

9. The electronic device according to claim 8, wherein the processor is caused to:
- receive a plurality of to-be-recognized wireless signals; wherein the plurality of wireless signals are wireless signals received at a plurality of time points in a continuous time period; and
- form the signal matrix with the plurality of wireless signals.

* * * * *